(12) United States Patent
Parla

(10) Patent No.: US 12,401,644 B2
(45) Date of Patent: Aug. 26, 2025

(54) ENFORCING CONDITIONAL ACCESS TO NETWORK SERVICES BASED ON AUTHORIZATION STATUSES ASSOCIATED WITH NETWORK FLOWS

(71) Applicant: Cisco Technology, Inc., San Jose, CA (US)

(72) Inventor: Vincent E. Parla, North Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 191 days.

(21) Appl. No.: 18/453,952

(22) Filed: Aug. 22, 2023

(65) Prior Publication Data
US 2025/0071111 A1 Feb. 27, 2025

(51) Int. Cl.
*H04L 9/40* (2022.01)
*H04L 61/4511* (2022.01)

(52) U.S. Cl.
CPC ...... *H04L 63/0876* (2013.01); *H04L 61/4511* (2022.05); *H04L 63/18* (2013.01)

(58) Field of Classification Search
CPC . H04L 63/0876; H04L 61/4511; H04L 63/18; H04L 63/0236
See application file for complete search history.

(56) References Cited

U.S. PATENT DOCUMENTS

| 7,793,100 | B2 * | 9/2010 | Arroyo | G06F 21/6218 |
| | | | | 726/17 |
| 9,038,151 | B1 * | 5/2015 | Chua | H04L 47/11 |
| | | | | 726/1 |
| 10,129,117 | B2 * | 11/2018 | Gupta | H04L 63/0876 |
| 12,003,478 | B1 * | 6/2024 | Karpuska | H04L 61/4511 |
| 2005/0005023 | A1 * | 1/2005 | Dobbins | H04L 45/38 |
| | | | | 709/238 |

(Continued)

OTHER PUBLICATIONS

Ferrazani Mattos, Diogo Menezes, and Otto Carlos Muniz Bandeira Duarte. "AuthFlow: authentication and access control mechanism for software defined networking." annals of telecommunications 71 (2016): 607-615.*

(Continued)

*Primary Examiner* — Jimmy H Tran
(74) *Attorney, Agent, or Firm* — Lee & Hayes, P.C.

(57) ABSTRACT

This disclosure describes techniques for enforcing conditional access to network services. In an example method, a first computing device detects a second device operating in a per-flow authorization mode. The first device receives a first request from a second computing device to communicate with a third computing device using a first network flow and determines that the first flow is authorized (e.g., because of an active past authentication and/or the third device's authentication exemption). Data associated with the first request is transmitted to the third device. The first device then receives a second request to communicate with a fourth computing device using a second network flow and determines that the second flow is not authorized (e.g., because it is not associated with an active past authentication and/or the fourth device is not exempt from authentication). Data associated with the second request is not transmitted to the fourth device.

20 Claims, 9 Drawing Sheets

(56) References Cited

U.S. PATENT DOCUMENTS

| | | | | |
|---|---|---|---|---|
| 2008/0282327 | A1* | 11/2008 | Winget | H04L 63/10 726/4 |
| 2009/0119507 | A1* | 5/2009 | Arroyo | G06F 21/6218 713/167 |
| 2012/0233657 | A1* | 9/2012 | Guevin | H04L 63/0272 726/1 |
| 2013/0091534 | A1* | 4/2013 | Gilde | H04L 63/10 726/13 |
| 2014/0059222 | A1* | 2/2014 | Short | H04L 63/104 709/225 |
| 2014/0201813 | A1* | 7/2014 | Barkie | H04L 63/107 726/4 |
| 2014/0245395 | A1* | 8/2014 | Hulse | H04W 12/068 726/4 |
| 2016/0037438 | A1* | 2/2016 | Manroa | H04W 12/06 370/338 |
| 2016/0094557 | A1* | 3/2016 | Kadur | H04W 12/06 726/3 |
| 2016/0127317 | A1* | 5/2016 | Ardeli | H04L 67/14 726/14 |
| 2016/0248795 | A1* | 8/2016 | Chien | H04L 63/227 |
| 2016/0359913 | A1* | 12/2016 | Gupta | H04L 63/1408 |
| 2017/0214677 | A1* | 7/2017 | Cai | H04L 63/08 |
| 2017/0244730 | A1* | 8/2017 | Sancheti | H04L 63/205 |
| 2018/0091557 | A1* | 3/2018 | Komu | H04L 63/08 |
| 2018/0097789 | A1* | 4/2018 | Murthy | H04L 63/0227 |
| 2018/0145986 | A1* | 5/2018 | Chien | H04L 45/745 |
| 2019/0109848 | A1* | 4/2019 | Clark | G06F 21/6263 |
| 2019/0124039 | A1* | 4/2019 | Kommula | H04L 67/1008 |
| 2019/0334855 | A1* | 10/2019 | Holloway | H04L 61/4511 |
| 2020/0162514 | A1* | 5/2020 | Rappard | H04L 61/5007 |
| 2021/0092095 | A1* | 3/2021 | Kim | H04L 63/0876 |
| 2021/0256783 | A1* | 8/2021 | Davis | G07C 9/28 |
| 2021/0392111 | A1* | 12/2021 | Sole | H04L 63/1416 |
| 2022/0070168 | A1* | 3/2022 | Ganapathy Achari | H04L 63/0876 |
| 2022/0159001 | A1* | 5/2022 | Cheng | H04L 63/20 |
| 2022/0247721 | A1* | 8/2022 | Kim | H04L 63/0236 |
| 2022/0286446 | A1* | 9/2022 | Hecht | H04L 63/0846 |
| 2022/0303278 | A1* | 9/2022 | Kirnapure | H04L 63/0236 |
| 2022/0329585 | A1* | 10/2022 | Chhabra | H04L 12/4633 |
| 2022/0337587 | A1* | 10/2022 | Thakur | H04L 63/083 |
| 2022/0375292 | A1* | 11/2022 | Ufkes | G07C 9/22 |
| 2023/0070426 | A1* | 3/2023 | Burakovsky | H04W 12/088 |
| 2023/0075237 | A1* | 3/2023 | Buck | G06F 21/121 |
| 2024/0106862 | A1* | 3/2024 | Head | H04L 63/20 |
| 2024/0179133 | A1* | 5/2024 | Sreekumar | H04L 63/0272 |
| 2024/0184877 | A1* | 6/2024 | Murphy | G06F 21/604 |
| 2024/0244044 | A1* | 7/2024 | Kim | H04L 63/029 |
| 2024/0314115 | A1* | 9/2024 | Parla | H04L 63/0884 |
| 2024/0314140 | A1* | 9/2024 | Beevor | H04L 63/107 |
| 2024/0323173 | A1* | 9/2024 | Kim | H04L 43/026 |
| 2024/0323488 | A1* | 9/2024 | Diamond | H04N 21/4623 |
| 2024/0340274 | A1* | 10/2024 | Kim | H04L 63/08 |
| 2024/0348540 | A1* | 10/2024 | Kim | H04L 63/08 |
| 2024/0380732 | A1* | 11/2024 | Kim | H04L 63/101 |
| 2024/0406213 | A1* | 12/2024 | Sengupta | H04L 63/105 |
| 2025/0039177 | A1* | 1/2025 | Kim | H04L 9/40 |

OTHER PUBLICATIONS

Matias, Jon, et al. "FlowNAC: Flow-based network access control." 2014 third European workshop on software defined networks. IEEE, 2014.*

Arden, Owen, Jed Liu, and Andrew C. Myers. "Flow-limited authorization." 2015 IEEE 28th Computer Security Foundations Symposium. IEEE, 2015.*

Ferrazani Mattos, Diogo Menezes, and Otto Carlos Muniz Bandeira Duarte. "AuthFlow: authentication and access control mechanisim for software defined networking." annals of telecommunications 71 (2016): 607-615.*

Zhu, Xianwei, et al. "Attribute-Guard: Attribute-Based Flow Access Control Framework in Software-Defined Networking." Security and Communication Networks 2020.1 (2020): 6302739.*

* cited by examiner

ENFORCING CONDITIONAL ACCESS TO NETWORK SERVICES BASED ON AUTHORIZATION STATUSES ASSOCIATED WITH NETWORK FLOWS

TECHNICAL FIELD

This present application pertains to network communication systems, and more particularly, to techniques for enforcing conditional access to network services based on per-flow authorization statuses associated with network flows.

BACKGROUND

In computer networking systems, it is crucial to control and manage access to network services in an effective, efficient, and secure manner. This involves the process of authorizing users based on certain criteria, and subsequently granting or denying access to network services. One of the challenges in this scenario is the efficient handling of time-sensitive processes such as Domain Name System (DNS) queries and Transmission Control Protocol (TCP) handshake requests, which may time out before a user can complete an authentication process.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
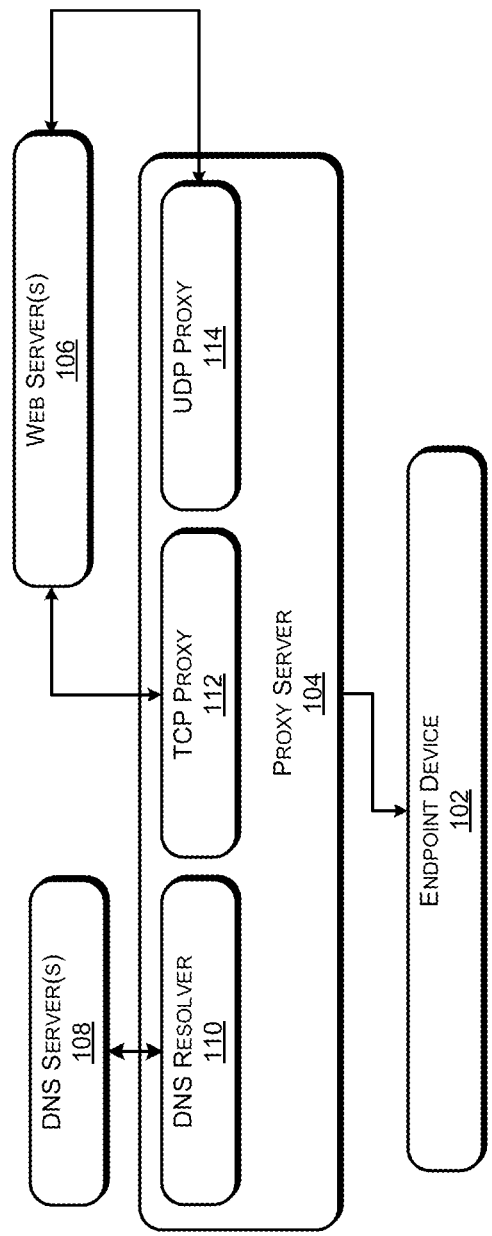
FIG. 1 an example environment for conditional access to network services based on per-flow authorization statuses associated with network flows.

This disclosure describes techniques for enforcing conditional access to network services based on per-flow authorization statuses associated with network flows. In some cases, the techniques described herein relate to a method including detecting, by a processor of a first computing device, that a second computing device is operating in a per-flow authorization mode. The method may further include receiving, from the second computing device, a first request to communicate using a first network flow between the second computing device and a third computing device. The method may further include determine that the first network flow is authorized, wherein determining that the first network flow is authorized comprises determining at least one of: (i) that the first network flow is associated with a past authentication that is active, or (ii) that the third computing device is exempt from an authentication requirement. The method may further include based on determining that the first network flow is authorized, transmitting first data associated with the first request to the third computing device. The method may further include receiving, from the second computing device, a second request to communicate using a second network flow between the second computing device and a fourth computing device. The method may further include determine that the second network flow is unauthorized based on determining that the second network flow is independent of any active authentications and that the fourth computing device is subject to the authentication requirement. The method may further include based on determining that the first network flow is unauthorized, blocking transmission of second data associated with the second request to the fourth computing device.

Additionally, the techniques described herein may be performed by a system and/or device having non-transitory computer-readable media storing computer-executable instructions that, when executed by one or more processors, performs the method described above.

Example Embodiments

This disclosure describes techniques for enforcing conditional access to network services based on per-flow authorization statuses associated with network flows. In some cases, an example system selectively allows or blocks access to a network service based on whether the network flow associated with the access request has been authorized. The techniques may enable a captive portal process to give additional time to a user to complete an authentication process by preventing timeouts associated with DNS queries or TCP handshake requests.

In some cases, if a network flow associated with a DNS query is not authorized, the example system synthesizes a DNS response with an artificial canonical name (CNAME) record referring to an invalid hostname. This DNS response causes the querying device to retry the query, which prevents the DNS process from timing out and gives time to user to authenticate. The example system continues responding with artificial CNAME records until authentication occurs, a timeout threshold expires, or authentication fails. If the user authenticates before timeout, the example system resolves the initial DNS query. If the timeout threshold expires or authentication fails (e.g., due to exceeding maximum number of allowable authentication attempts), then the example system may redirect the querying device to a block page.

In some cases, if a network flow associated with a TCP handshake request is not authorized, the example system establishes a partial two-party TCP connection with the requesting device only, without connecting to the destination device. This two-party TCP connection provides the impression of a successful TCP handshake to the requesting device and prevents the TCP request from timing out, thus giving the user more time to authenticate. The example system maintains the two-party connection, dropping all packets received in association with that connection, until authentication occurs, a timeout threshold expires, or authentication fails. If the user authenticates before timeout, the example system creates the three-way TCP connection with the destination and starts to relay packets associated with that connection. If the timeout threshold expires or authentication fails (e.g., due to exceeding maximum number of allowable authentication attempts), then the example system may redirect the querying device to a block page.

In some cases, if a network flow associated with a UDP packet is not authorized, the example system drops the UDP packet. The sending device may retry sending packets due to retransmission mechanisms. The example system continues dropping UDP packets associated with a network flow until authentication occurs, a timeout threshold expires, or authentication fails. If the user authenticates before timeout, the example system starts to relay packets associated with the network flow. If the timeout threshold expires or authentication fails (e.g., due to exceeding maximum number of allowable authentication attempts), then the example system may redirect the querying device to a block page.

In some cases, by giving users additional time to perform authentication before reaching a timeout, the techniques described herein reduce the number of reload requests, which in turn reduces the computational load on server devices and proxy servers. Moreover, by enabling selective captive portal enforcement on a network flow level, the techniques described herein enhance security of access to network resources. For example, the techniques described herein can be used to enable selective captive portal enforcement in virtual private network (VPN) or zero trust network access (ZTNA) environments.

FIG. 1 an example environment 100 for conditional access to network services based on per-flow authorization statuses associated with network flows. Environment 100 includes an endpoint device 102, a proxy server 104, multiple web servers 106, and multiple DNS servers 108.

The endpoint device 102 may be a computing device operated by an end user that generates requests to access network services hosted by the web servers 106 via the proxy server 104. The endpoint device 102 may be, for example, a personal computer, smartphone, tablet computer, smart television, Internet of Things (IoT) device, or other type of computing device capable of connecting to a network and accessing network services. The endpoint device 102 may execute software applications such as a web browser or other applications that generate network connection requests and communicate with the proxy server 104 and web servers 106 over a network.

The proxy server 104 operates as an intermediary between the endpoint device 102 and the web servers 106 that host various network services. The proxy server 104 may be configured to conditionally relay traffic between the endpoint device 102 and the web servers 106 based on authorization statuses associated with different network flow. A network flow that has been previously authenticated or may be directed to an allowlisted destination device may be relayed normally by the proxy server 104. However, a network flow that is not authorized or directed to a non-allowlisted destination can be blocked or redirected by the proxy server 104 to facilitate authentication.

A network flow may refer to a sequence of packets sent between two nodes (e.g., between the endpoint device 102 and one of the web servers 106) over a network, where the sequence of packets shares certain characteristics. For example, a network flow may include packets belonging to a particular TCP connection or UDP communication stream between a client and server. The packets in a network flow may have a common source address, destination address, source port, destination port, and/or transport protocol.

In some cases, the proxy server 104 processes a DNS query, a TCP handshake request, or a data packet received from the endpoint device 102 to determine the corresponding network flow. The proxy server 104 then determines whether the network flow is authorized. A network flow may be determined to be authorized if it is associated with an active authentication (e.g., if it has been previously authenticated and the authentication has not expired) or if it is associated with a destination device that is allowlisted. In some cases, the proxy server 104 maintains a database that describes network flows that are associated with active authentications. When a new DNS query or data packet arrives, the relevant proxy component (e.g., one of the DNS resolver 110, TCP proxy 112, or UDP proxy 114) processes the source and destination identifiers of the query or data packet to match it to an existing flow in the database. If a match is found, the network flow is determined to be authorized.

The proxy server 104 may include several components to enable conditional access to the web servers 106. A DNS resolver 110 may process domain name system (DNS) queries received from the endpoint device 102. The DNS resolver 110 determines whether the endpoint device 102 is authorized to communicate with the destination specified in the DNS query based on the authorization status of the corresponding network flow. If the network flow is authorized, the DNS query may be resolved by querying one of the DNS servers 108 to retrieve an IP address for the destination web server 106. If the network flow is not authorized, the DNS resolver 110 synthesizes a DNS response with an artificial canonical name (CNAME) record (e.g., a CNAME record that refers to an inauthentic hostname, such as a randomly generated hostname) that refers to an inauthentic hostname (e.g., a randomly generated hostname). This causes the endpoint device 102 to retry the DNS query with the inauthentic hostname, during which time the user can be prompted to authenticate.

In some cases, the DNS resolver 110 continues to respond to DNS queries with inauthentic hostnames until the earlier of network flow authentication or the expiration of a threshold period from the receipt of the initial DNS query. If the threshold period expires before authentication is completed, the DNS resolver 110 may redirect the endpoint device 102 to a block webpage (e.g., by returning the IP address of the block webpage). The block webpage may describe the reason for blocking access to the requested hostname. In some cases, if the authentication fails, the DNS resolver 110 may redirect the endpoint device 102 to the block webpage.

The TCP proxy 112 may process TCP handshake requests received from the endpoint device 102 based on the authorization status of the corresponding network flow. If the network flow is authorized, the TCP proxy 112 may establish a normal three-party TCP handshake between the endpoint device 102 and destination web server 106 with the proxy acting as a relay. If the network flow is not authorized, the TCP proxy 112 may establish a two-party TCP connection between the endpoint device 102 and proxy server 104. This prevents the connection request from timing out during authentication process. Once authentication is complete, the TCP proxy 112 can establish the full three-party TCP connection with the web server 106.

In some cases, the TCP proxy 112 continues to respond to TCP packets transmitted using the two-party TCP handshake by refusing to relay those packets until the earlier of network flow authentication or the expiration of a threshold period from the receipt of the initial DNS query. If the threshold period expires before authentication is completed, the TCP proxy 112 may redirect the endpoint device 102 to a block webpage. The block webpage may describe the reason for blocking access to the requested hostname. In some cases, if the authentication fails, the TCP proxy 112 may redirect the endpoint device 102 to the block webpage.

The UDP proxy 114 may process UDP packets received from the endpoint device 102 based on the authorization status of the corresponding network flow. If the network flow is authorized, the UDP proxy 114 may relay UDP packets to destination web server 106. If the network flow is not authorized, the UDP proxy 114 may drop the UDP packet. In some cases, because UDP has longer time-out periods and is a connectionless protocol, there is no need for creating a two-party connection to provide the impression of a successful connection to the endpoint device 102.

In some cases, the UDP proxy 114 continues to drop UDP packets until the earlier of network flow authentication or the expiration of a threshold period from the receipt of the initial DNS query. If the threshold period expires before authentication is completed, the UDP proxy 114 may redirect the endpoint device 102 to a block webpage. The block webpage may describe the reason for blocking access to the requested hostname. In some cases, if the authentication fails, the UDP proxy 114 may redirect the endpoint device 102 to the block webpage.

The web servers 106 may host various network applications and services accessible to endpoint devices 102 via the proxy server 104. Examples of web servers 106 include servers associated with web sites, messaging services, streaming media services, enterprise applications, and online games. Web servers 106 may respond to a request relayed by the proxy server 104 after the corresponding network flow is authorized.

DNS servers 108 may provide domain name resolution services used by the DNS resolver 110 component of the proxy server 104. DNS servers 108 can include public DNS servers or private DNS servers operating locally within the network environment. Examples of DNS servers 108 include top-level domain (TLD) DNS servers, domain-level DNS servers, and subdomain-level DNS servers.

In an example workflow, to access a network service hosted by one of the web servers 106, the endpoint device 102 initiates a DNS query for the hostname of the web server 106 and sends this request to the proxy server 104. The DNS resolver 110 04 obtains the authorization status of the network flow between the endpoint device 102 and the destination web server 106 and determines that the network flow is not authorized. Accordingly, the DNS resolver 110 returns a DNS response to the endpoint device 102 containing an inauthentic CNAME record with a randomly generated hostname. The endpoint device 102 automatically retries the DNS query using this inauthentic hostname. Meanwhile, the user of the endpoint device 102 is prompted to authenticate, for example by prompting for credentials or initiating multi-factor authentication. Until the authentication is completed, the DNS resolver 110 continues to provide CNAME records with inauthentic hostnames to the endpoint device 102, which then leads to new DNS queries by the endpoint device 102. Once authentication is complete, the DNS resolver 110 detects that the network flow is now authorized. Accordingly, the DNS resolver 110 uses the DNS servers 108 to resolve the IP address of the original web server hostname. DNS resolver 110 may return this IP address to the endpoint device 102.

In another example workflow, to communicate with a destination web server 106 using a TCP connection, the endpoint device 102 sends a TCP handshake request (a SYNC packet) to the TCP proxy 112. The TCP proxy 112 obtains the authorization status of the network flow associated with the TCP connection between the endpoint device and the destination web server 106 and determines that the network flow is not authorized. Accordingly, the TCP proxy 112 does not create a three-party TCP connection but still returns a handshake acknowledgment (a SYNC-ACK packet) to the endpoint device 102. Having received the handshake acknowledgment, the endpoint device 102 sends an acknowledgement of the handshake acknowledgement (an ACK packet) and starts to send data using the TCP connection. Meanwhile, the user of the endpoint device 102 is prompted to authenticate, for example by prompting for credentials or initiating multi-factor authentication. Until the authentication is completed, the TCP proxy 112 does not relay packets received using the network flow to the destination web server 106 and acknowledges those packets without delivering them to the destination. Once the authentication is complete, the TCP proxy 112 establishes a three-party TCP connection and starts to relay packets received from the endpoint device in relation to the network flow to the destination web server 106.

In an additional example workflow, to communicate with a destination web server 106 using a UDP connection, the endpoint device 102 sends a UDP packet to the UDP proxy 114. The UDP proxy 114 obtains the authorization status of the network flow associated with the UDP connection between the endpoint device and the destination web server 106 and determines that the network flow is not authorized. Accordingly, the UDP proxy 114 drops the UDP packet. This may cause the endpoint device 102 to transmit the UDP packet again. The UDP proxy 114 may continue to drop UDP packets associated with the network flow until that network flow is authorized.

The proxy server 104 may be used to enable selective captive portal enforcement in virtual private network (VPN) or zero trust network access (ZTNA) environments. In these environments, the proxy server 104 can be used to enable previously authenticated network flows and network flows to allowlisted destinations but disable network flows to non-allowlisted destinations that have not been previously authenticated.

For example, if a DNS query seeks the IP address of a non-allowlisted web server 106, the DNS resolver 110 may be configured to continue to respond to the DNS query with inauthentic-hostname CNAME records until the DNS resolver 110 determines that the network flow between the endpoint device 102 and the non-allowlisted web server 106 is authenticated.

As another example, if a TCP handshake request seeks a TCP connection with a non-allowlisted web server 106, the TCP proxy 112 may be configured to establish a two-party TCP connection and maintain this TCP connection until the TCP proxy 112 determines that the network flow between the endpoint device 102 and the non-allowlisted web server 106 is authenticated. If the TCP proxy 112 determines that the network flow between the endpoint device 102 and the non-allowlisted web server 106 is authenticated, the TCP proxy 112 establishes a three-party TCP connection that involves the endpoint device 102, the non-allowlisted web server 106, and the proxy server 104.

Figure 2:
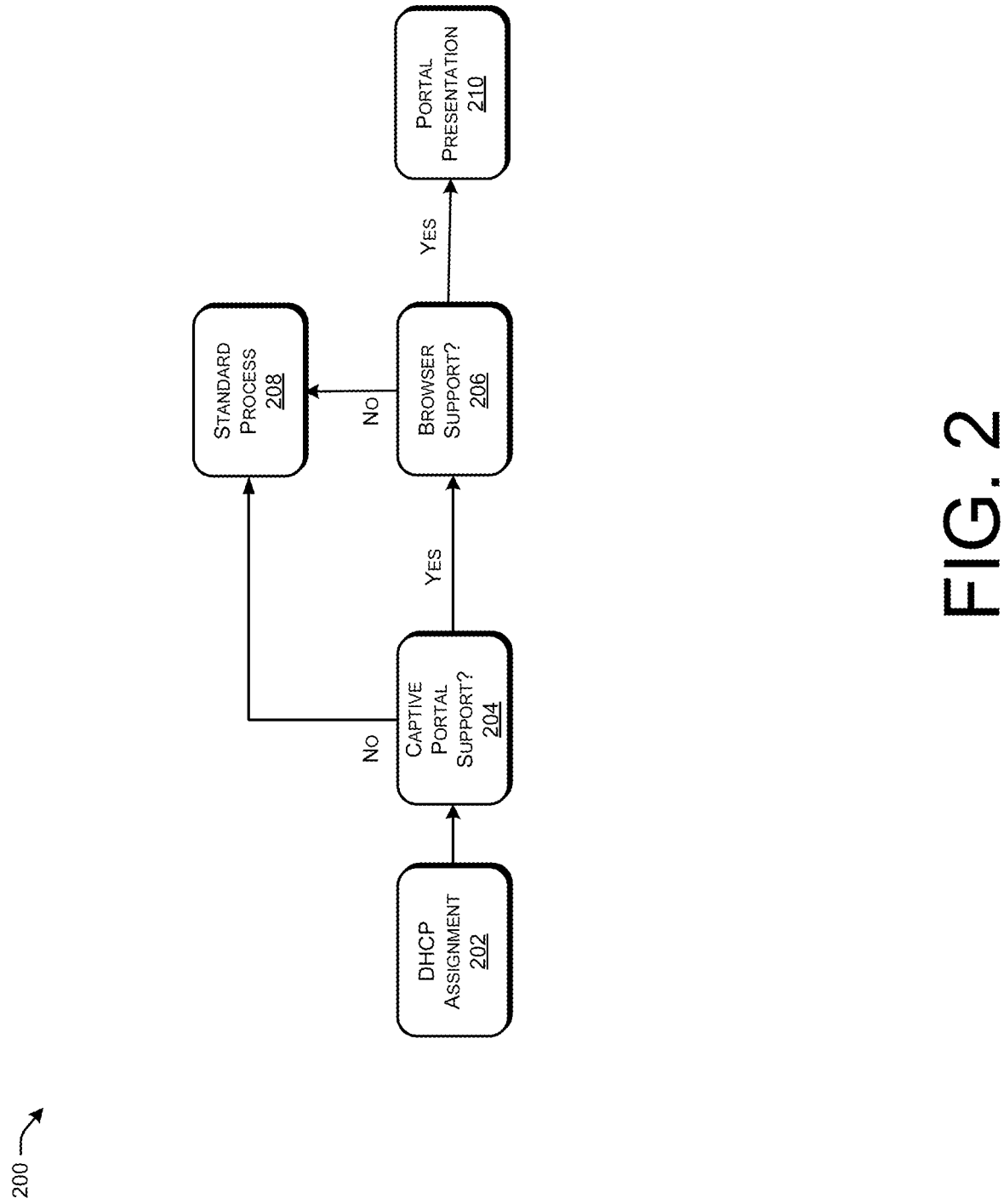
FIG. 2 is a flowchart diagram of an example process for enabling a capital portal workflow.

FIG. 2 is a flowchart diagram of an example process 200 for enabling a capital portal workflow. As depicted in FIG. 2, at operation 202, a Dynamic Host Configuration Protocol (DHCP) assigns an IP address to the computing device being connected to the network. At operation 204, the system determines whether the computing device supports captive portals. If so, then the system proceeds to operation 206. Otherwise, the system proceeds to operation 208 to use connection patterns other than a captive portal workflow.

At operation 206, the system determines whether a web browser being used by the computing device supports active portals. If so, then the system proceeds to operation 210. Otherwise, the system proceeds to operation 208 to use connection patterns other than a captive portal workflow.

At operation 210, the system presents a captive portal. The captive portal may be presented using a standard web browser using a captive portal mini browser (CPMB). In some cases, if the captive portal is presented using a CPMB, the system may close the CPMB upon successful connection.

Figure 3:
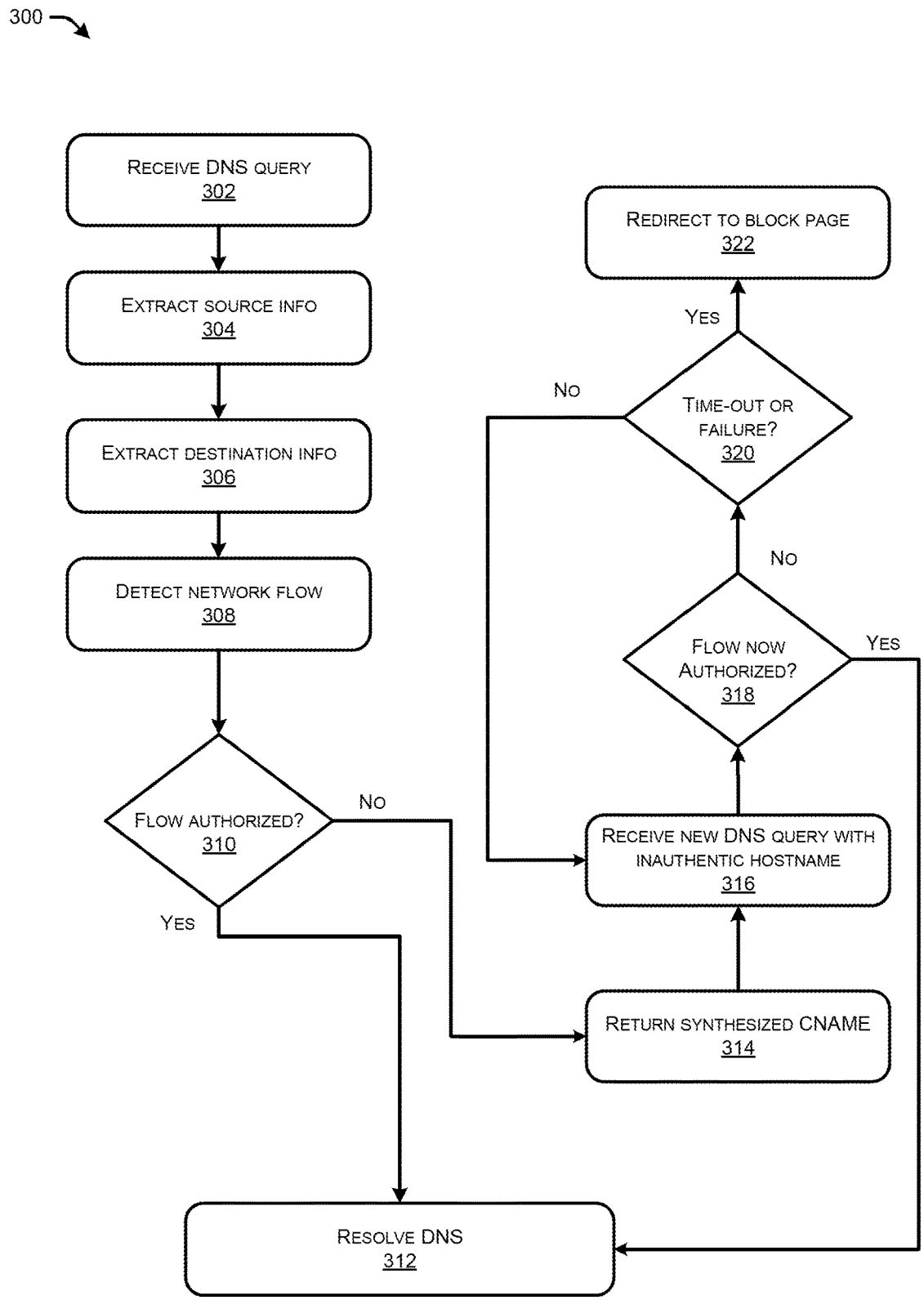
FIG. 3 is a flowchart diagram of an example process for processing DNS queries from a source computing device when the source computing device is operating in a per-flow authorization mode.

FIG. 3 is a flowchart diagram of an example process 300 for processing DNS queries from a source computing device when the source computing device is operating in a per-flow authorization mode. The per-flow authorization mode may require that each network flow be authorized and only allowed if it is either associated with an active authentication (e.g., if it has been previously authenticated and the authentication is active) or if it is to an allowlisted destination.

The process 300 begins when the system receives a DNS query from a source computing device (operation 302). The DNS query may include a requested hostname that the source computing device is attempting to resolve to an IP address.

Upon receiving the DNS query, the system extracts and records the source IP address of the DNS query (operation 304). This source IP address may identify the source computing device that originated the query.

The system then extracts the requested hostname from the DNS query (operation 306). This hostname may identify the web server or other network service that the source computing device is attempting to access.

Using the recorded source IP address and requested hostname, the system detects the network flow associated with this DNS query (operation 308). The network flow may be characterized by a source device and a destination device.

The system then determines whether the corresponding network flow associated with the DNS query is authorized (operation 310). The system may check a database or other data structure that tracks authentication status of different network flows. The system may determine that the network flow is authorized if the network flow is associated with an active authentication, or the destination is allowlisted. If the network flow associated with this DNS query is authorized (operation 310—yes), then the system performs normal DNS resolution by querying one or more external DNS servers for the IP address of the requested hostname (operation 312). The system may receive the IP address response from the DNS servers and return this IP address in a DNS response to the source computing device. This response may enable the source computing device to initiate direct communication with the destination web server using the resolved IP address.

If the system determines that the network flow is not authorized (operation 310—no), then the system generates a canonical name (CNAME) record with an inauthentic hostname, such as a randomly generated string. The system returns this synthesized CNAME record with the inauthentic hostname to the source computing device in a DNS response (operation 314). In some cases, after the source computing device receives this DNS response, it will automatically retry the DNS query using the inauthentic hostname from the CNAME record. This causes the source computing device to send a new DNS query to the system using the fake hostname. Upon receiving this retry DNS query with the inauthentic hostname (operation 316), the system checks whether the original network flow associated with the initial DNS query has now been authorized (operation 318). The system may determine whether the network flow has become authorized since the initial DNS query, for example due to the user authenticating.

If the network flow is now authorized (operation 318—yes), the system performs normal DNS resolution to retrieve the real IP address, as in operation 312. The real IP address is returned to the source computing device to allow access. If the network flow is still not authorized (operation 318—no), the system checks whether a timeout threshold has been reached since the receipt of the initial DNS query or if authentication has failed (e.g., due to failing a maximum number of allowed attempts for authentication) (operation 320). If the timeout threshold has not yet been reached and the authentication has not failed (operation 320—no), the system again synthesizes and returns another CNAME record with a different inauthentic hostname (repeat operation 314). This causes additional retry queries from the source computing device. If the timeout threshold has been reached or authentication has failed (operation 320—yes), the system returns the IP address of a block webpage to the source computing device instead of the real IP address (operation 322).

Figure 4:
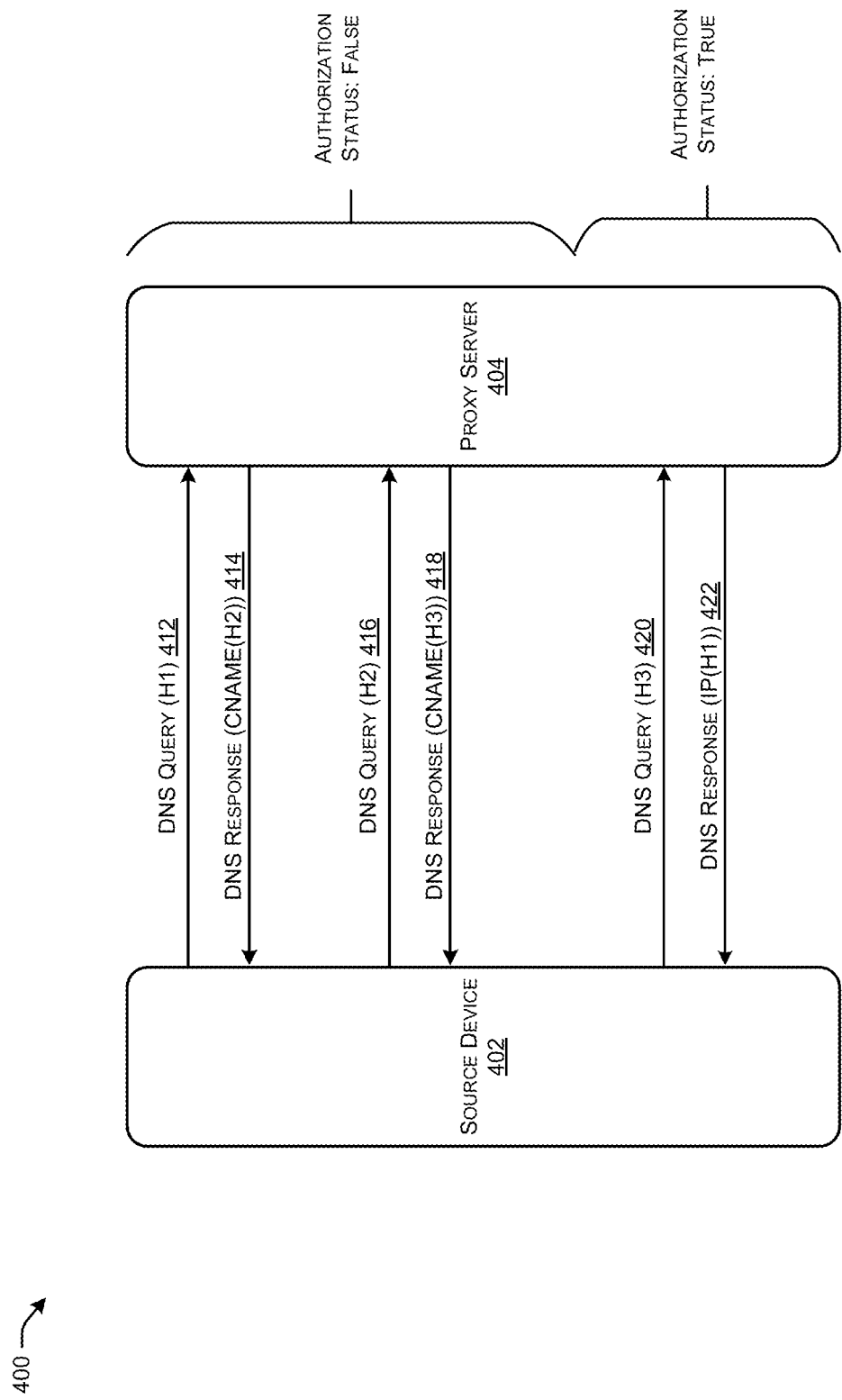
FIG. 4 provides an operational example of processing DNS queries from a source computing device when the source computing device is operating in a per-flow authorization mode.

FIG. 4 provides an operational example 400 of processing DNS queries from a source computing device 402 when the source computing device is operating in a per-flow authorization mode. As depicted in FIG. 4, after the initial DNS query 412 by the source computing device 402 that includes a requested hostname H1, the DNS resolver 404 returns a DNS response 414 with a CNAME response describing an inauthentic hostname H2 because the network flow is not authorized. Thereafter, the source computing device 402 sends a second DNS query 416 for H1, and the DNS resolver 404 responds with the DNS response 418 with a CNAME response describing an inauthentic hostname H3, because the network flow is still not authorized. The source computing device 402 then sends the DNS query 420 for H3. At this point, because the network flow is authorized, the DNS resolver 404 returns DNS response 422 that includes the IP address for H1, the originally requested hostname.

Figure 5:
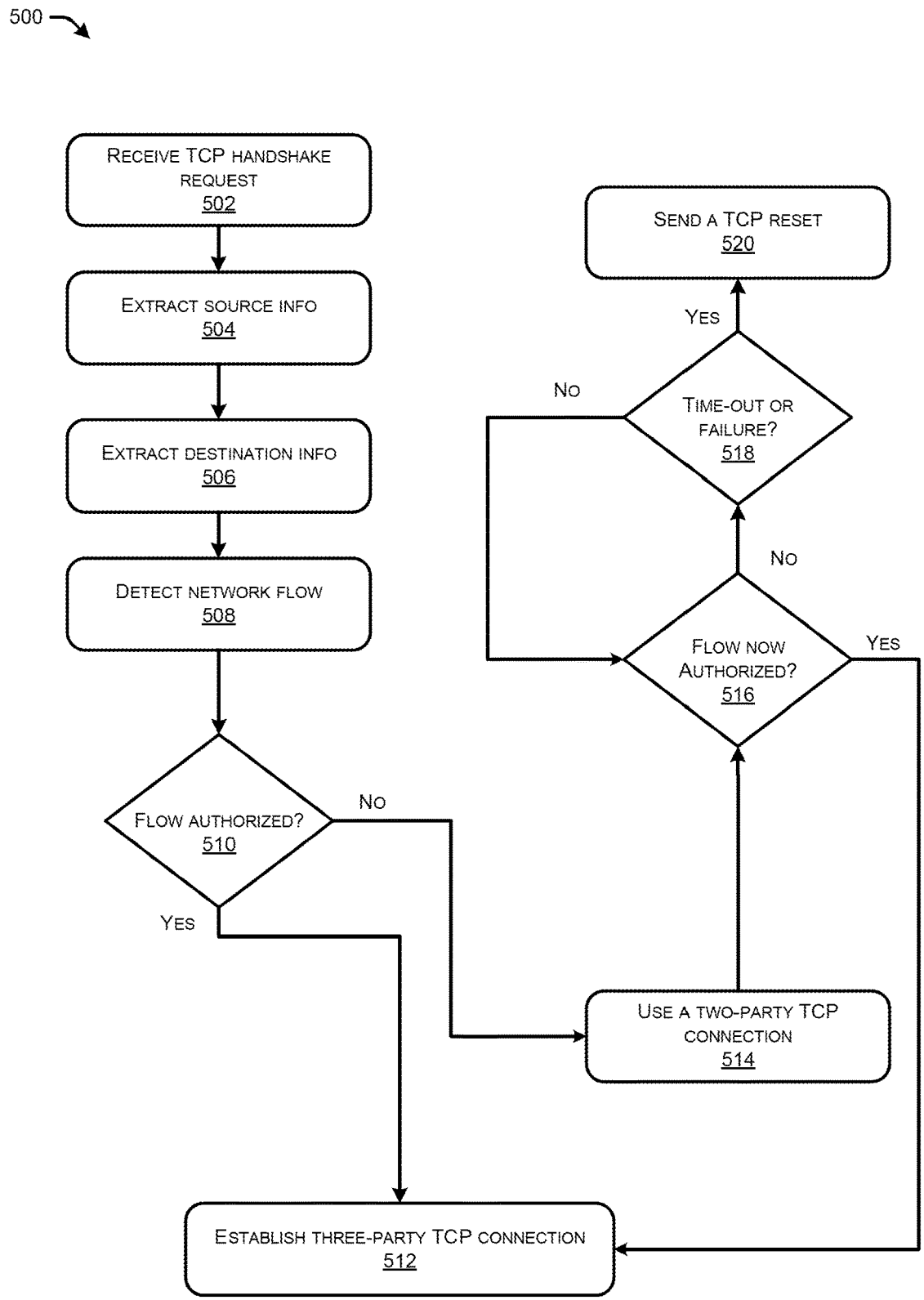
FIG. 5 is a flowchart diagram of an example process for processing TCP data packets transmitted by a source computing device while the source computing device is operating in a per-flow authorization mode.

FIG. 5 is a flowchart diagram of an example process 500 for processing TCP data packets transmitted by a source computing device while the source computing device is operating in a per-flow authorization mode. As depicted in FIG. 5, process 500 begins when the system receives a TCP handshake request (SYNC packet) from a source computing device attempting to establish a TCP connection with a destination computing device (operation 502). The system then records the source IP address and source port of the TCP handshake request to identify the source computing device (operation 504). The system also records the destination IP address and destination port specified in the TCP handshake packet to identify the intended destination device (operation 506).

Using the source and destination identifiers, the system detects the network flow associated with this TCP connection request (operation 508). The network flow may be characterized by the source IP address, source port number, destination IP address, and destination port number.

The system then determines whether the network flow associated with this TCP connection request is currently authorized (operation 510). The system may determine that the network flow is authorized if the network flow has an active authentication, or if the destination is allowlisted.

If the system determines that the network flow is authorized (operation 510—yes), the system performs normal TCP forwarding by relaying the handshake and subsequent packets (e.g., the TCP handshake acknowledgement (SYNC-ACK packet) and the acknowledgement of the TCP handshake acknowledgement (ACK packet)) between the source computing device and destination device (operation 512). This may establish a typical three-party TCP connection.

If the system determines that the determines network flow is not authorized (operation 510—no), the system returns a TCP handshake response (SYNC-ACK packet) directly to the source computing device without relaying the handshake request to the intended destination device. This may establish a two-party TCP connection. After the source computing device returns an acknowledgement (ACK packet) of the TCP handshake acknowledgement (SYNC-ACK packet), the system receives and processes this ACK packet (operation 514). But the system does not forward this packet to the destination device, instead acknowledging the packets directly back to the source device only. This may establish a partial two-party TCP connection between just the source computing device and the system, excluding the destination device. From the perspective of the source device, the connection has been established successfully.

Afterward, the system determines whether network flow associated with this TCP connection has now been authenticated (operation 516). This determination may be performed periodically and/or may be triggered when the system receives a TCP packet associated with the two-party TCP connection. This determination may determine if the flow has become authorized while the system has been maintaining the two-party connection.

If the system determines that network flow is now authorized (operation 516—yes), the system establishes the full three-party TCP connection by forwarding the stored handshake request to the destination device (operation 516). With the three-party handshake completed, the system now forwards packets normally between the source and destination.

If the system determines that network flow is still not authorized (operation 516—no), the system determines whether a timeout threshold has elapsed since the initial TCP connection request or whether the authentication has failed (operation 518). If the timeout has not yet expired and the authentication has not failed (operation 518—no), the system continues maintaining the two-party TCP connection with the source computing device only, without forwarding packets to the destination device until a next determination at operation 516.

If the timeout has expired or if the authentication has failed (operation 518—yes), the system sends a TCP reset (RST) to the source computing device instead of forwarding the stored packets to the destination (operation 520). This closes the TCP connection from the perspective of the source device. The system may also direct the source computing device to a block webpage.

Figure 6:
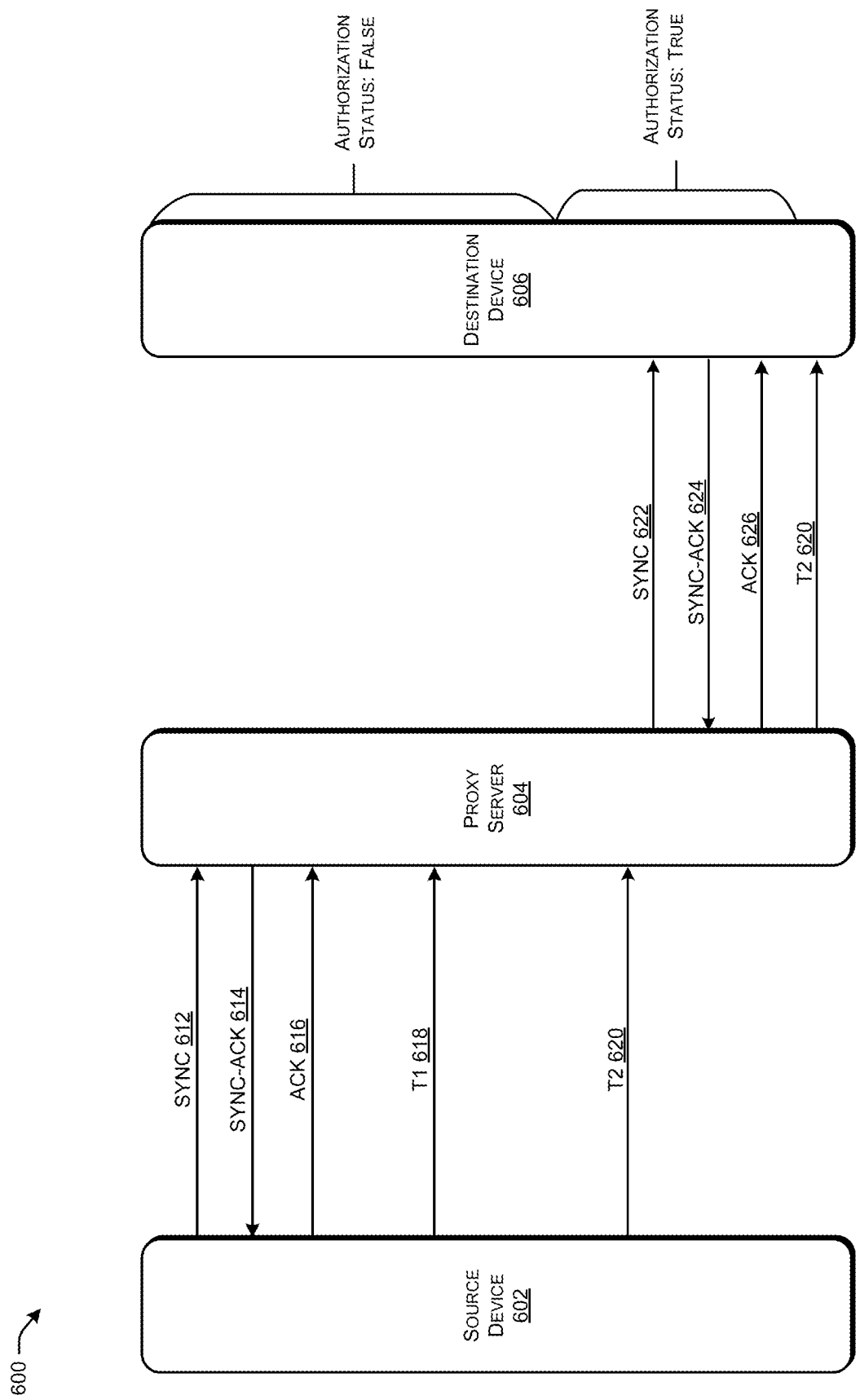
FIG. 6 provides an operational example of processing a SYNC packet received from a source computing device for establishing a TCP connection with a destination computing device.

FIG. 6 provides an operational example 600 of processing a SYNC packet 612 received from a source computing device 602 for establishing a TCP connection with a destination computing device 606. As depicted in FIG. 6, after the TCP proxy 604 receives the SYNC packet 612, the TCP proxy 604 returns a SYNC-ACK packet 614 but does not establish a TCP connection between itself and the destination computing device 606, because the source computing device 602 is not authorized to connect to the destination computing device 606. Afterward, the source computing device 602 provides an ACK packet 616 to the TCP proxy 604 to acknowledge the TCP connection indicated by the SYNC-ACK packet 614.

When the source computing device 602 transmits TCP packet T1 618, the TCP proxy 604 does not relay T1 618 to destination computing device 606, as the source computing device 602 is still not authorized to connect to the destination computing device 606. When the source computing device 602 transmits TCP packet T2 620, the TCP proxy 604: (i) detects that the source computing device 602 is now authorized to connect to the destination computing device 606, (ii) transmits the SYNC packet 622 to the destination computing device 606, (ii) receives the SYNC-ACK packet 624 from the destination computing device 606, (iii) transmits the ACK packet 626 to the destination computing device 606, and (iv) relays T2 620 to the destination computing device 606.

Figure 7:
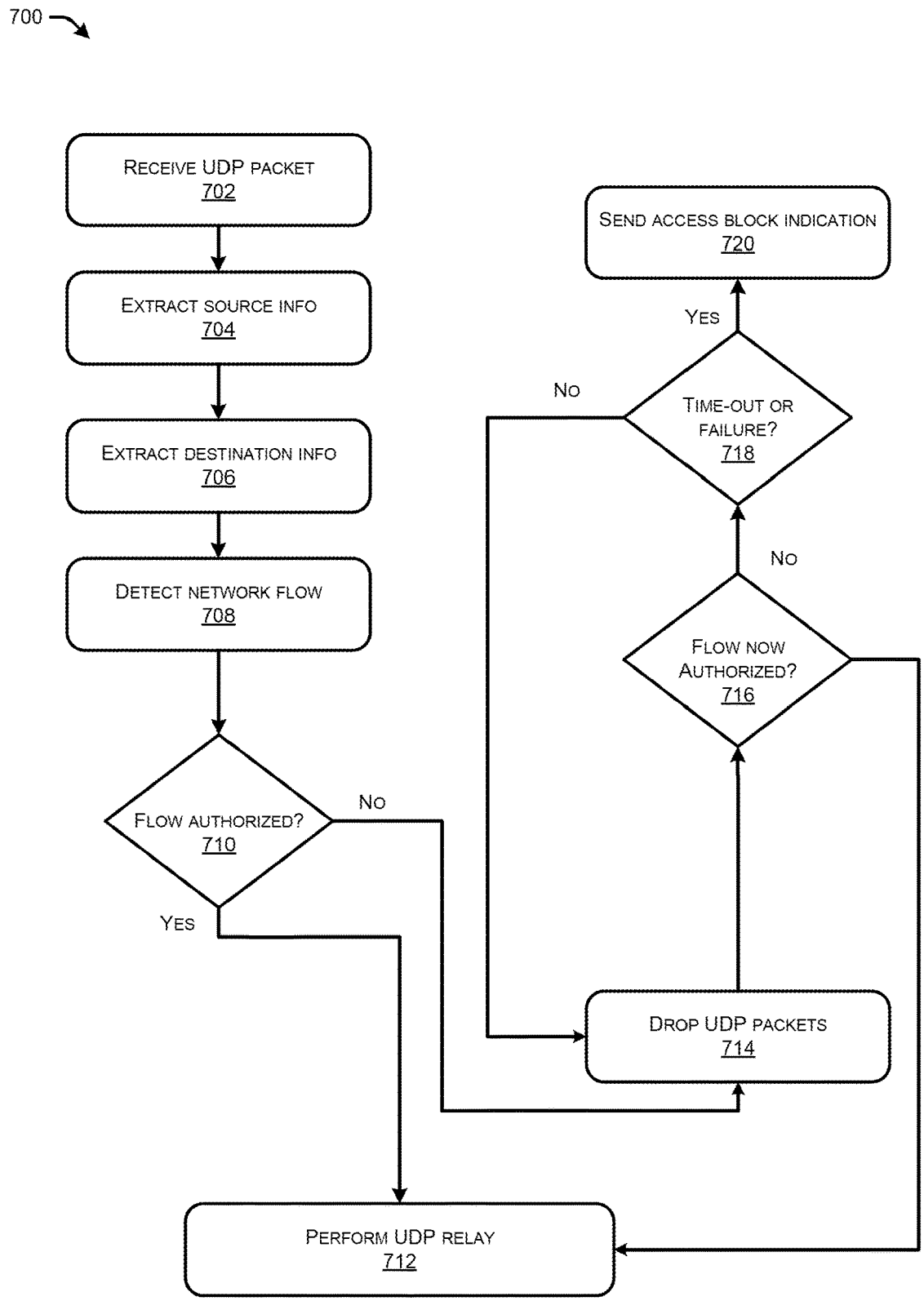
FIG. 7 is a flowchart diagram of an example process for processing User Datagram Protocol (UDP) data packets transmitted by a source computing device while the source computing device is operating in a per-flow authorization mode.

FIG. 7 is a flowchart diagram of an example process 700 for processing UDP data packets transmitted by a source computing device while the source computing device is operating in a per-flow authorization mode. Process 700 begins when the system component of the proxy server receives a UDP packet from a source computing device for transmission to a destination computing device (operation 702). The system then records the source IP address and source port of the UDP packet to identify the source device (operation 704). The system also records the destination IP address and destination port from the UDP packet to identify the intended destination device (operation 706).

Using the source and destination information, the system detects the network flow associated with this UDP communication stream (operation 708). The system determines whether the network flow associated with this UDP packet is currently authorized (operation 710). The system then determines if the flow is authorized (e.g., if the flow has an active authentication or the destination associated with the flow is allowlisted).

If the system determines that the network flow is authorized (operation 710—yes), the system forwards the UDP packet to the destination device (operation 712). If the system determines that the network flow is not authorized (operation 710—no), the system does not forward the UDP packet. Instead, because UDP is a connectionless protocol, the system silently drops the UDP packet (operation 714). From the perspective of the source computing device, this dropped packet will appear as though it was lost in transmission. The source device may retry sending the UDP packet due to built-in retransmission mechanisms.

The system then determines whether the network flow is authorized (operation 716). This determination may be performed periodically and/or may be triggered when the system receives a UDP packet associated with the network flow (e.g., when the source device retransmits the dropped UDP packet). If the system determines that the network flow is now authorized (operation 716—yes), the system forwards the UDP packets associated with the network flow to the destination device (operation 712).

If the system determines that the network flow is still unauthorized (operation 716—no), the system determines whether a timeout threshold has passed since the initial UDP packet was received or whether authentication has failed (operation 718). If the system determines that the timeout has not yet expired and the authentication has not failed (operation 718—no), the system continues dropping packets over this network flow while waiting for authorization. The source computing device may continue retrying the transmission. If the system determines that the timeout has expired or authentication has failed (operation 718—yes), the system sends a communication to the source computing device indicating that access to the destination is blocked (operation 720). For example, the system may return a block webpage to the source computing device.

Figure 8:
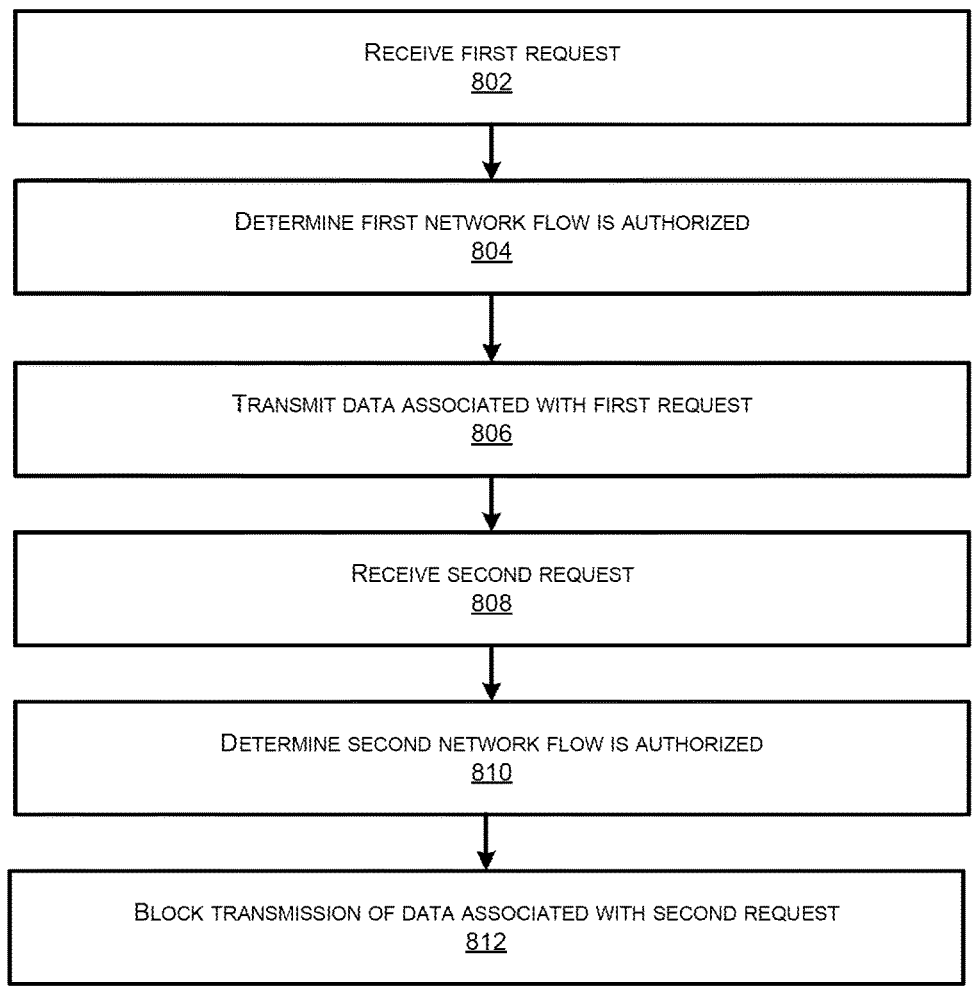
FIG. 8 is a flowchart diagram of an example process for enabling selective permission of network flows while a source computing device is operating in a per-flow authorization mode.

FIG. 8 is a flowchart diagram of an example process for enabling selective permission of network flows while a source computing device is operating in a per-flow authorization mode. As depicted in FIG. 8, process 800 begins when the system receives a first request to communicate using a first network flow between the source computing device and a first destination computing device (operation 802). The first request may be a DNS query, a TCP handshake request, a TCP packet transmitted using an established TCP connection, or a UDP packet.

The system then determines that the first network flow is authorized (operation 804). In some cases, determining that the first network flow is authorized includes determining at least one of: (i) that the first network flow is associated with a past authentication that is active, or (ii) that the first destination computing device is exempt from an authentication requirement (e.g., is allowlisted, is not blocklisted, and/or the like). Because the first network flow is authorized, the system then transmits data associated with the first request to the first computing device (operation 806).

The system then receives a second request to communicate using a second network flow between the source computing device and a second destination computing device (operation 808). The second request may be a DNS query, a TCP handshake request, a TCP packet transmitted using an established TCP connection, or a UDP packet.

The system then determines that the second network flow is not authorized (operation 810). In some cases, determining that the second network flow is unauthorized includes determining both: (i) that the second network flow is independent of (e.g., is not associated with) any active authorizations, or (ii) that the second destination computing device is exempt from the authentication requirement (e.g., is not allowlisted, is blocklisted, and/or the like). Because the second network flow is unauthorized, the system then blocks transmission data associated with the first request to the first computing device (operation 812).

In some cases, determining that the second network flow is independent of any active authentications comprises determining that the second request includes a first DNS query that includes a hostname that is associated with the second destination computing device. In some cases, blocking transmission of the data associated with the second network flow includes a first DNS response to the first computing device that includes a CNAME record associated with a first inauthentic hostname that is independent of the second destination computing device. In some cases, the system then receives a second DNS query from the source device that includes the first inauthentic hostname. Based on determining that the second network flow is unauthorized, the system may transmit a second DNS response with a second CNAME record having a second inauthentic hostname to the source device. In some cases, the first and second inauthentic hostnames are independent of (e.g., not associated with, invalid hostnames for, and/or the like) the destination device. In some cases, the first and second inauthentic hostnames are randomly generated text strings. In some cases, based on determining that the second network flow, the system initiates resolution of the initial DNS query. In some cases, based on determining that the second network flow is still unauthorized and that a threshold time has passed since a time associated with the initial DNS query, the system redirects the source device to a block page.

In some cases, determining that the second network flow is independent of any active authentications comprises determining that the second request comprises a TCP handshake request with the second destination computing device. In some cases, blocking transmission of data associated with the second request includes: (i) transmitting a handshake acknowledgement response to the source computing device to establish a two-party TCP connection between the source computing device and the system, and (ii) preventing establishment of a three-party TCP connection between the source device, the second destination device, and the system. In some cases, the system then receives new data transmitted using the TCP connection acknowledged by the handshake acknowledgement response from the source device. However, based on determining the second network flow is still unauthorized, the system prevents transmission of the new data to the second destination computing device. In some cases, based on determining that the second network flow is still unauthorized, and that the threshold time has passed since a time associated with the first TCP handshake request, redirecting the first computing device to a block page. In some cases, based on determining the second network flow is now authorized, the system establishes a three-party TCP connection and relays data associated with that connection.

Figure 9:
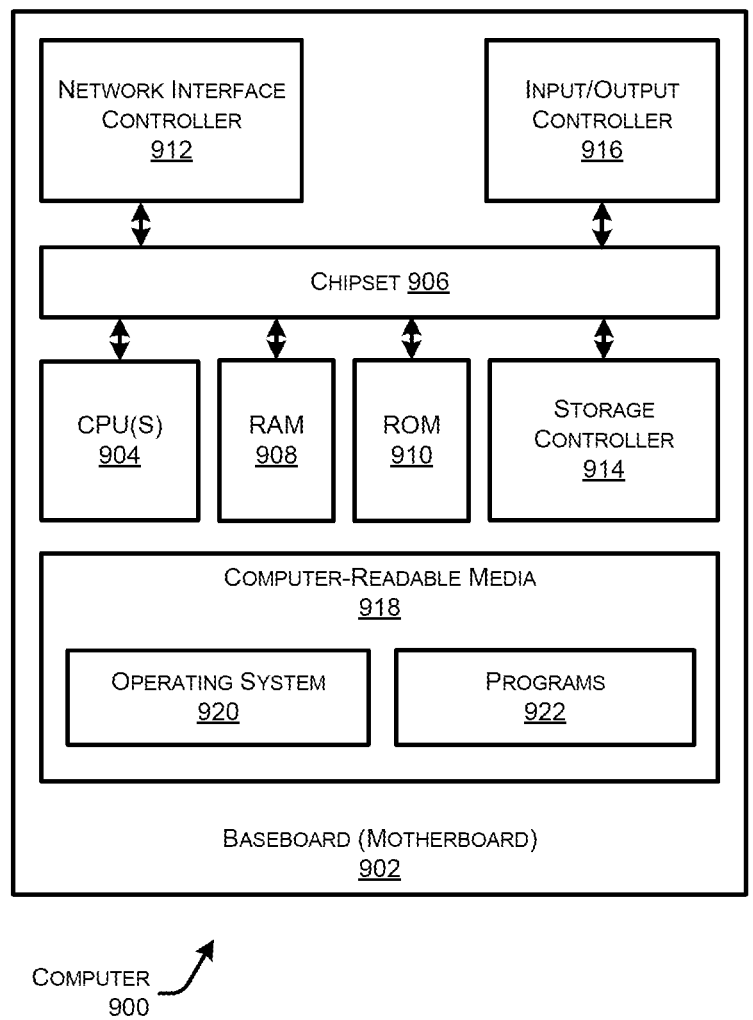
FIG. 9 shows an example computer architecture for a computing device (or network routing device) capable of executing program components for implementing the functionality described above.

FIG. 9 shows an example computer architecture for a computing device (or network routing device) 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computing device 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computing device 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computing device 900. The chipset 906 can further provide an interface to a computer-readable storage medium such as a read-only memory ("ROM") 910 or non-volatile RAM ("NVRAM") for storing basic routines that help to start up the computing device 900 and to transfer information between the various components and devices. The ROM 910 or NVRAM can also store other software components necessary for the operation of the computing device 900 in accordance with the configurations described herein.

The computing device 900 can operate in a networked environment using logical connections to remote computing devices and computer systems through a network. The chipset 906 can include functionality for providing network connectivity through a NIC 912, such as a gigabit Ethernet adapter. The NIC 912 can connect the computing device 900 to other computing devices over the network. It should be appreciated that multiple NICs 912 can be present in the computing device 900, connecting the computer to other types of networks and remote computer systems.

The computing device 900 can be connected to a storage device 918 that provides non-volatile storage for the computing device 900. The storage device 918 can store an operating system 920, programs 922, and data, which have been described in greater detail herein. The storage device 918 can be connected to the computing device 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computing device 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 can further read information from the storage device 918 by detecting the physical states or characteristics of one or more locations within the physical storage units.

In addition to the mass storage device 918 described above, the computing device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 900. In some examples, the operations performed by a network, and/or any components included therein (e.g., a router, such as an edge router), may be supported by one or more devices similar to computing device 900. Stated otherwise, some or all of the operations performed by the network, and or any components included therein, may be performed by one or more computing device 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computing device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the computing device 900.

In one embodiment, the storage device 918 or other computer-readable storage media is encoded with computer-executable instructions which, when loaded into the computing device 900, transform the computer from a general-purpose computing system into a special-purpose computer capable of implementing the embodiments described herein. These computer-executable instructions transform the computing device 900 by specifying how the CPUs 904 transition between states, as described above. According to one embodiment, the computing device 900 has access to computer-readable storage media storing computer-executable instructions which, when executed by the computing device 900, perform the various processes described above with regard to FIGS. 1-8. The computing device 900 can also include computer-readable storage media having instructions stored thereupon for performing any of the other computer-implemented operations described herein.

The computing device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computing device 900 might not include all of the components shown in FIG. 9, can include other components that are not explicitly shown in FIG. 9, or might utilize an architecture completely different than that shown in FIG. 9.

The computing device 900 may support a virtualization layer, such as one or more components associated with a computing resource network. The virtualization layer may provide virtual machines or containers that abstract the underlying hardware resources and enable multiple operating systems or applications to run simultaneously on the same physical machine. The virtualization layer may also include components for managing the virtualized resources, such as a hypervisor or virtual machine manager, and may provide network virtualization capabilities, such as virtual switches, routers, or firewalls. By enabling the sharing and efficient utilization of physical resources, virtualization can help reduce costs, simplify management, and increase flexibility in deploying and scaling computing workloads. The computing device 900 may also support other software layers, such as middleware, application frameworks, or databases, that provide additional abstraction and services to application developers and users. In some cases, the computing device 900 may provide a flexible and scalable platform for hosting diverse workloads and applications, from simple web services to complex data analytics and machine learning tasks.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
  detecting, by a processor of a first computing device, that a second computing device is operating in a per-flow authorization mode;
  receiving, from the second computing device, a first request to communicate using a first network flow between the second computing device and a third computing device;
  determining that the first network flow is authorized, wherein determining that the first network flow is authorized comprises determining at least one of: (i) that the first network flow is associated with a past authentication that is active, or (ii) that the third computing device is exempt from an authentication requirement;
  based on determining that the first network flow is authorized, transmitting first data associated with the first request to the third computing device;
  receiving, from the second computing device, a second request to communicate using a second network flow between the second computing device and a fourth computing device;
  determining that the second network flow is unauthorized based on determining that the second network flow is independent of any active authentications and that the fourth computing device is subject to the authentication requirement; and
  based on determining that the first network flow is unauthorized, blocking transmission of second data associated with the second request to the fourth computing device.

2. The method of claim 1, wherein:
  determining that the second network flow is independent of any active authentications comprises determining that the second request comprises a first domain name system (DNS) query, wherein the first DNS query comprises a hostname that is associated with the fourth computing device, and
  blocking transmission of the second data comprises transmitting a first DNS response to the first computing device, wherein the first DNS response comprises a canonical name (CNAME) record associated with a first inauthentic hostname that is independent of the fourth computing device.

3. The method of claim 2, further comprising:
  receiving, from the second computing device, a second DNS query, wherein the second DNS query comprises the first inauthentic hostname;
  determining that the second network flow is still unauthorized; and
  based on determining that the second network flow is still unauthorized, transmitting a second DNS response to the second computing device, wherein the second DNS response comprises a second CNAME record associated with a second inauthentic hostname that is independent of the fourth computing device.

4. The method of claim 3, further comprising:
  receiving, from the second computing device, a third DNS query, wherein the third DNS query comprises the second inauthentic hostname;
  determining that the second network flow is still unauthorized and that a threshold time has passed since a time associated with the first DNS query; and
  based on determining that the second network flow is still unauthorized and that the threshold time has passed since the time associated with the first DNS query, redirecting the first computing device to a block page.

5. The method of claim 2, further comprising:
  receiving, from the second computing device, a second DNS query, wherein the second DNS query comprises the first inauthentic hostname;
  determining that the second network flow is authorized; and
  based on determining that the second network flow is authorized, determining that the second network flow is authorized, initiating resolution of the first DNS query.

6. The method of claim 1, wherein:
  determining that the second network flow is independent of any active authentications comprises determining that the second request comprises a Transmission Control Protocol (TCP) handshake request with the fourth computing device; and
  blocking transmission of the second data comprises:
    transmitting a handshake acknowledgement response to the first computing device, wherein the handshake acknowledgement response establishes a two-party TCP connection between the first computing device and the second computing device, and preventing establishment of a three-party TCP connection between the first computing device, the second computing device, and the fourth computing device.

7. The method of claim 6, wherein:

receiving, from the second computing device, third data associated with the second network flow;

determining that the second network flow is still unauthorized; and based on determining that the second network flow is still unauthorized, preventing transmission of the third data to the fourth computing device.

8. The method of claim 7, further comprising:

receiving, from the second computing device, fourth data associated with the second network flow;

determining that the second network flow is still unauthorized and that a threshold time has passed since a time associated with the TCP handshake request; and based on determining that the second network flow is still unauthorized and that the threshold time has passed since the time associated with the TCP handshake request, redirecting the first computing device to a block page.

9. The method of claim 6, further comprising:

receiving, from the second computing device, third data associated with the second network flow;

determining that the second network flow is authorized; and based on determining that the second network flow is authorized:

establishing the three-party TCP connection, and transmitting the third data to the fourth computing device using the three-party TCP connection.

10. The method of claim 1, wherein:

the second request comprises a user datagram protocol (UDP) packet; and blocking transmission of the second data comprises preventing transmission of the second data to the fourth computing device.

11. A system comprising:

one or more processors; and one or more computer-readable media storing computer-executable instructions that, when executed by a processor of a first computing device, cause the processor to perform operations comprising:

detecting that a second computing device is operating in a per-flow authorization mode;

receiving, from the second computing device, a first request to communicate using a first network flow between the second computing device and a third computing device;

determining that the first network flow is authorized, wherein determining that the first network flow is authorized comprises determining at least one of: (i) that the first network flow is associated with a past authentication that is active, or (ii) that the third computing device is exempt from an authentication requirement;

based on determining that the first network flow is authorized, transmitting first data associated with the first request to the third computing device;

receiving, from the second computing device, a second request to communicate using a second network flow between the second computing device and a fourth computing device;

determining that the second network flow is unauthorized based on determining that the second network flow is independent of any active authentications and that the fourth computing device is subject to the authentication requirement; and based on determining that the first network flow is unauthorized, blocking transmission of second data associated with the second request to the fourth computing device.

12. The system of claim 11, wherein:

determining that the second network flow is independent of any active authentications comprises determining that the second request comprises a first domain name system (DNS) query, wherein the first DNS query comprises a hostname that is associated with the fourth computing device, and blocking transmission of the second data comprises transmitting a first DNS response to the first computing device, wherein the first DNS response comprises a canonical name (CNAME) record associated with a first inauthentic hostname that is independent of the fourth computing device.

13. The system of claim 12, the operations further comprising:

receiving, from the second computing device, a second DNS query, wherein the second DNS query comprises the first inauthentic hostname;

determining that the second network flow is still unauthorized; and based on determining that the second network flow is still unauthorized, transmitting a second DNS response to the second computing device, wherein the second DNS response comprises a second CNAME record associated with a second inauthentic hostname that is independent of the fourth computing device.

14. The system of claim 13, the operations further comprising:

receiving, from the second computing device, a third DNS query, wherein the third DNS query comprises the second inauthentic hostname;

determining that the second network flow is still unauthorized and that a threshold time has passed since a time associated with the first DNS query; and based on determining that the second network flow is still unauthorized and that the threshold time has passed since the time associated with the first DNS query, redirecting the first computing device to a block page.

15. The system of claim 12, the operations further comprising:

receiving, from the second computing device, a second DNS query, wherein the second DNS query comprises the first inauthentic hostname;

determining that the second network flow is authorized; and based on determining that the second network flow is authorized, determining that the second network flow is authorized, initiating resolution of the first DNS query.

16. One or more non-transitory computer-readable media storing computer-executable instructions that, when executed by a processor of a first computing device, cause the processor to perform operations, comprising:

detecting that a second computing device is operating in a per-flow authorization mode;

receiving, from the second computing device, a first request to communicate using a first network flow between the second computing device and a third computing device;

determining that the first network flow is authorized, wherein determining that the first network flow is authorized comprises determining at least one of: (i) that the first network flow is associated with a past authentication that is active, or (ii) that the third computing device is exempt from an authentication requirement;

based on determining that the first network flow is authorized, transmitting first data associated with the first request to the third computing device;

receiving, from the second computing device, a second request to communicate using a second network flow between the second computing device and a fourth computing device;

determining that the second network flow is unauthorized based on determining that the second network flow is independent of any active authentications and that the fourth computing device is subject to the authentication requirement; and based on determining that the first network flow is unauthorized, blocking transmission of second data associated with the second request to the fourth computing device.

17. The one or more non-transitory computer-readable media of claim 16, wherein:

determining that the second network flow is independent of any active authentications comprises determining that the second request comprises a first domain name system (DNS) query, wherein the first DNS query comprises a hostname that is associated with the fourth computing device, and blocking transmission of the second data comprises transmitting a first DNS response to the first computing device, wherein the first DNS response comprises a canonical name (CNAME) record associated with a first inauthentic hostname that is independent of the fourth computing device.

18. The one or more non-transitory computer-readable media of claim 17, the operations further comprising:

receiving, from the second computing device, a second DNS query, wherein the second DNS query comprises the first inauthentic hostname;

determining that the second network flow is still unauthorized; and based on determining that the second network flow is still unauthorized, transmitting a second DNS response to the second computing device, wherein the second DNS response comprises a second CNAME record associated with a second inauthentic hostname that is independent of the fourth computing device.

19. The one or more non-transitory computer-readable media of claim 18, the operations further comprising:

receiving, from the second computing device, a third DNS query, wherein the third DNS query comprises the second inauthentic hostname;

determining that the second network flow is still unauthorized and that a threshold time has passed since a time associated with the first DNS query; and based on determining that the second network flow is still unauthorized and that the threshold time has passed since the time associated with the first DNS query, redirecting the first computing device to a block page.

20. The one or more non-transitory computer-readable media of claim 17, the operations further comprising:

receiving, from the second computing device, a second DNS query, wherein the second DNS query comprises the first inauthentic hostname;

determining that the second network flow is authorized; and based on determining that the second network flow is authorized, determining that the second network flow is authorized, initiating resolution of the first DNS query.

\* \* \* \* \*